United States Patent [19]
Ohtake et al.

[11] Patent Number: 5,780,148
[45] Date of Patent: Jul. 14, 1998

[54] HYDROPHILIC THIN FILM AND METHOD OF MANUFACTURING THE SAME

[75] Inventors: Tadashi Ohtake, Neyagawa; Norihisa Mino, Settsu; Kazufumi Ogawa, Nara, all of Japan

[73] Assignee: Matsushita Electric Industrial Co., Ltd., Osaka, Japan

[21] Appl. No.: 944,800

[22] Filed: Oct. 6, 1997

Related U.S. Application Data

[63] Continuation of Ser. No. 625,091, Apr. 1, 1996, abandoned, which is a continuation of Ser. No. 375,275, Jan. 19, 1995, abandoned, which is a continuation of Ser. No. 151,301, Nov. 12, 1993, abandoned.

[30] Foreign Application Priority Data

Nov. 12, 1992 [JP] Japan .................................. 4-302124

[51] Int. Cl.$^6$ ............................................. B32B 7/04
[52] U.S. Cl. .................. 428/333; 427/387; 427/399; 427/430.1; 428/420; 428/428; 428/447; 428/448; 428/451
[58] Field of Search ................... 427/387, 399, 427/430.1; 428/333, 420, 428, 447, 448, 451

[56] References Cited

U.S. PATENT DOCUMENTS

| | | | |
|---|---|---|---|
| 4,373,009 | 2/1983 | Winn | 428/424.2 |
| 4,539,061 | 9/1985 | Sagiv | 156/278 |
| 4,761,316 | 8/1988 | Ogawa | 428/64 |
| 4,992,300 | 2/1991 | Ogawa | 427/44 |
| 5,156,918 | 10/1992 | Marks | 428/447 |

FOREIGN PATENT DOCUMENTS

| | | |
|---|---|---|
| 221 046 | 5/1987 | European Pat. Off. . |
| 472 936 | 3/1992 | European Pat. Off. . |
| 472 990 | 3/1992 | European Pat. Off. . |
| 508 136 | 10/1992 | European Pat. Off. . |
| 511 548 | 11/1992 | European Pat. Off. . |
| 6 917 276 | 5/1971 | Netherlands . |

OTHER PUBLICATIONS

Search Report from the European Patent Office dated Mar. 18, 1994.

*Primary Examiner*—D. S. Nakarani
*Attorney, Agent, or Firm*—Morrison & Foerster LLP

[57] ABSTRACT

The invention relates to a hydrophilic thin film and a method of manufacturing the same in which the hydrophilic thin film is formed by incorporating or fixing molecules comprising hydrophilic groups to a chemically adsorbed film on a substrate surface.

8 Claims, 14 Drawing Sheets

HYDROPHILIC THIN FILM AND METHOD OF MANUFACTURING THE SAME

This application is a continuation of application Ser. No. 08/625,091, filed Apr. 1, 1996, now abandoned, which is a continuation of application Ser. No. 08/375,275, filed Jan. 19, 1995, which is a continuation of application Ser. No. 08/151,301, filed Nov. 12, 1993, both abandoned.

FIELD OF THE INVENTION

The invention relates to a hydrophilic thin film and a method of manufacturing the same. More specifically, the invention relates to a hydrophilic thin film and its method of manufacture, in which molecules comprising hydrophilic groups are incorporated or chemically bonded to the surface of a chemically adsorbed film on a substrate surface.

BACKGROUND OF THE INVENTION

Conventional methods of adding hydrophilic properties to substrate surfaces include a method of applying chemicals or resins which contain hydrophilic compounds such as polyvinyl alcohol and polyethylene glycol to substrate surfaces, a method of coating hydrophilic films containing the compounds to the surfaces, and the like.

Another conventional method is chemically reforming substrate surfaces. For example, a substrate surface can be oxidized by the irradiation with a high-energy light source such as an excimer laser and the like in an ozone atmosphere. Due to the oxidation treatment, carboxyl groups or hydroxyl groups are formed on the substrate surface.

Basic chemical adsorption methods include the procedure mentioned, for example, in J. Sagiv, Journal of American Chemical Society, 102: 92 (1980) and in K. Ogawa et al., Langmuir, 6: 851 (1990). In these methods, a chemically adsorbed film is manufactured by a dehydrochlorination reaction of molecules comprising chlorosilyl groups (a chemical adsorbent) to a substrate surface comprising hydroxyl groups and the like, thus fixing the chlorosilyl groups to the substrate surface via covalent bonds.

However, the method of applying hydrophilic chemicals or resins and the method of coating hydrophilic films have problems with respect to transparency and endurance. In other words, in the above described methods, transparency is likely to be reduced, and the applied materials or the coated films can be easily peeled off or damaged.

Although the oxidation treatment can improve the hydrophilic properties of substrate surfaces, those surfaces are also likely to be damaged by the treatment. In some cases, for instance, the substrate surfaces are carbonized, thus hardening and discoloring the surfaces.

SUMMARY OF THE INVENTION

An object of the invention is to provide a hydrophilic thin film which is formed on a substrate surface without damaging the surface while retaining the transparency and endurance of the surface. A further object of the invention is to provide a method of manufacturing the hydrophilic thin film.

In order to accomplish the above objects, the hydrophilic thin film of the invention is formed by incorporating or fixing molecules comprising hydrophilic groups to the surface of a chemically adsorbed film via chemical bonds. The molecule comprising hydrophilic groups is at least one molecule selected from the group consisting of sacchrides, cyclodextrins, polyethers, polyalcohols, polyethylene oxides, Poly-N-vinyllactams, polymetha acrylamides, polymethacrylamides acids, polymethacrylic acid esters, and polyvinyl amines.

In this composition, it is preferable that the chemically adsorbed film is chemically bonded to the substrate surface via at least one atom selected from the group consisting of C, Si, Ge, Sn, Ti, Zr and S.

In this composition, it is also preferable that the chemically adsorbed film is a monomolecular film or a multilayer monomolecular film.

In this composition, it is further preferable that the hydrophilic group is at least one group selected from the group consisting of an ether group, a sulfide group, an ester group, a phosphonyl group (—PO$_2$—), a phosphinyl group (—PO—), a sulfonyl group (—SO$_2$—), a sulfinyl group (—SO—), a hydroxyl group, a carboxyl group, a sulfonic acid group, a sulfinic acid group, a phosphoric acid group, a phosphorous acid group, a quaternary ammonium group, a quaternary phosphonium group, a thiol group, an amino group, a sulfate ester group, and a functional group in which the H atom, of at least one functional group selected from the group consisting of a hydroxyl group, a carboxyl group, a sulfonic acid group, a sulfinic acid group, a phosphoric acid group, a phosphorous acid group, and a thiol group, is replaced with an alkali metal or an alkali earth metal.

The method of manufacturing the hydrophilic thin film comprises the steps of:

chemically bonding the chemically adsorbed film comprising functional groups on a substrate surface;

introducing or fixing at least one molecule having hydrophilic groups selected from the group consisting of sacchrides, cyclodextrins, polyethers, polyalcohols, polyethylene oxides, Poly-N-vinyllactams, polymethacrylamides, polymethacrylic acids, polymethacrylic acid esters, and polyvinyl amines to said chemically adsorbed film, thereby fixing the molecule to the surface of the film or introducing the molecule into the chemically adsorbed film.

In this composition, it is preferable that the chemically adsorbed film comprises at least one functional group selected from the group consisting of a functional group of Formula 1, a functional group of Formula 2, a halogenated sulfonyl group of Formula 3, a halogenated sulfinyl group of Formula 4, and a cyano group (—CN).

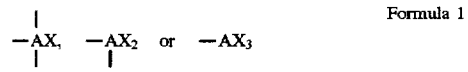

Formula 1

(wherein A represents Si, Ge, Sn, Ti or Zr; and X, X$_2$ and X$_3$ independently represents a halogen, an alkoxyl group, a cyano group or an isocyanate group)

Formula 2

(wherein A' represents N or O)

Formula 3

(wherein X represents a halogen)

Formula 4

(wherein X represents a halogen)

In this composition, it is also preferable that the hydrophilic group is at least one group selected from the group consisting of an ether group, a sulfide group, an ester group, a phosphonyl group (—PO$_2$—), a phosphinyl group (—PO—), a sulfonyl group (—SO$_2$—), a sulfinyl group (—SO—), a hydroxyl group, a carboxyl group, a sulfonic acid group, a sulfinic acid group, a phosphoric acid group, a phosphorous acid group, a quaternary ammonium group, a quaternary phosphonium group, a thiol group, an amino group, a sulfate ester group, and a functional group in which the H atom, of at least one functional group selected from the group consisting of a hydroxyl group, a carboxyl group, a sulfonic acid group, a sulfinic acid group, a phosphoric acid group, a phosphorous acid group, and a thiol group, is replaced with an alkali metal or an alkali earth metal.

In this composition, it is further preferable that the chemically adsorbed film is a monomolecular film or a monomolecular multilayer film.

DETAILED DESCRIPTION OF THE INVENTION

Figure 1:
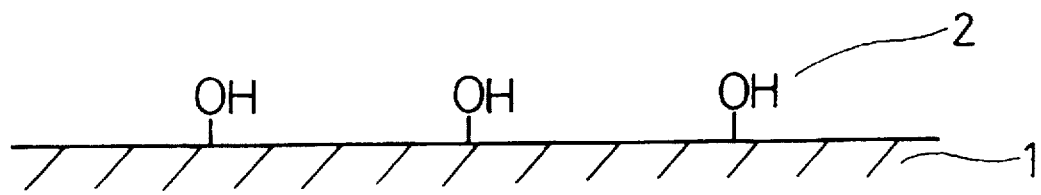
FIG. 1 shows an enlarged sectional view of a glass substrate as used in the examples.

A hydrophilic thin film of the invention is manufactured by chemically bonding molecules comprising hydrophilic groups to a substrate surface via a chemically adsorbed film which is formed in advance on the surface. As a result, the number of hydrophilic groups is significantly increased from the number of those present on the untreated surface of the substrate or chemically adsorbed film, thus improving hydrophilic properties.

The hydrophilic group of the molecule is at least one group selected from the group consisting of an ether group, a sulfide group, an ester group, a phosphonyl group (—PO$_2$—), a phosphinyl group (—PO—), sulfonyl group (—SO$_2$—), a sulfinyl group (—SO—), a hydroxyl group, a carboxyl group, a sulfonic acid group, a sulfinic acid group, a phosphoric acid group, a phosphorous acid group, a quaternary ammonium group, a quaternary phosphonium group, a thiol group, an amino group, a sulfate ester group, and a functional group in which the H atom, of at least one functional group selected from the group consisting of a hydroxyl group, a carboxyl group, a sulfonic acid group, a sulfinic acid group, a phosphoric acid group, a phosphorous acid group, and a thiol group, is replaced with an alkali metal or an alkali earth metal. The molecule may include one or more than one type of hydroxyl group.

The molecule comprising the hydrophilic groups is at least one molecule selected from the group consisting of monosaccharides; disaccharides; polysaccharides; polyethers; polyalcohols; polyethylene oxides; Poly-N-vinyllactams such as hydroxylalkylalcohol, Poly-N-vinylpyrrolidone, and Poly-N-vinylcaprolactam; polymethacrylamides such as polyacrylamide, and polydiacetone acrylamide; polymethacryls such as polyacrylic acid, and polyhydroxyalkyl acrylate; and polyvinyl amines such as polymethacrylic acid ester, and polyvinyl pyridine. One or more than one type of molecule can be fixed to the substrate surface.

The hydrophilic properties of the film can be controlled by changing the density or kind of hydrophilic groups. Methods of controlling the density of the hydrophilic groups include a method of changing the number of hydroxyl groups or carboxyl groups of the molecules; a method of controlling the reaction time for incorporating and fixing the molecules comprising hydroxyl groups to the chemically adsorbed film surface on the substrate; and a method of controlling the density of the functional groups on the chemically adsorbed film surface on the substrate. These methods can be combined to control the hydrophilic properties.

The molecules comprising hydroxyl groups are chemically reacted to the functional groups of the chemically adsorbed film, thus firmly fixing the molecules to the film via covalent bonds or ionic bonds. This reaction is a polymerization, a coupling, an addition, substitution, or exchange reaction.

A multilayer monomolecular film can be formed by repeating the steps of fixing molecules comprising hydrophilic groups to the chemically adsorbed film (inner layer), forming another chemically adsorbed film by reacting a chemical adsorbent to the hydrophilic groups, and fixing the molecules comprising hydrophilic groups to the chemically adsorbed film.

Hydrophilic properties can be evaluated by measuring the contact angles of water and the evaporation time for a drop of water. The higher the hydrophilic properties become, the lower the contact angles of water become. As the evaporation time for a drop of water becomes shorter, the hydrophilic properties improve.

Since the density of hydrophilic groups is increased by forming a hydrophilic thin film of the invention on a substrate surface, the density of a chemically adsorbed film or the like formed on the hydrophilic thin film can be improved. More specifically, the chemically adsorbed film is formed by fixing molecules comprising at least one functional group selected from the group consisting of a functional group of Formula 1 set forth above, a functional group of Formula 2 set forth above, a halogenated sulfonyl group of Formula 3 set forth above, a halogenated sulfonyl group of Formula 4 set forth above, and a cyano group (—CN) due to a condensation reaction between the hydrophilic groups on the substrate surface and the functional groups. Therefore, the density of the chemically adsorbed film is improved as the density of the hydrophilic groups on the substrate surface increases. Thus, the hydrophilic thin film is clearly useful as an inner layer.

The density of the chemically adsorbed film formed on the surface of the hydrophilic thin film is high, and the chemically adsorbed film formed by fixing molecules comprising, e.g., alkyl groups, to the surface of the hydrophilic thin film has significant water-repelling properties. Due to the improvement in the water-repelling properties of the chemically adsorbed film, the hydrophilic property of the hydrophilic thin film (inner layer) is also improved.

The substrate comprising on its surface at least one functional group selected from the group consisting of an ether group, a sulfide group, an ester group, a phosphonyl group (—PO$_2$—), a phosphinyl group (—PO—), a sulfonyl group (—SO$_2$—), a sulfinyl group (—SO—), a hydroxyl group, a carboxyl group, a sulfonic acid group, a sulfinic acid group, a phosphoric acid group, a phosphorous acid group, a quaternary ammonium group, a quaternary phosphonium group, a thiol group, an amino group, a sulfate ester group, and a functional group in which the H atom, of at least one functional group selected from the group consisting of a hydroxyl group, a carboxyl group, a sulfonic acid group, a sulfinic acid group, a phosphoric acid group, a phosphorous acid group, and a thiol group, is replaced with an alkali metal or an alkali earth metal, or this substrate formed with a chemically adsorbed film comprising this functional group can be used as a substrate of the invention. However, the substrate is not limited to these substrates.

When the substrate does not have a functional group on its surface, the substrate surface should be treated with UV/ozone, oxygen plasma, or oxidizing agents such as potassium permanganate, in order to introduce or increase the functional groups on the substrate surface.

A method of contacting a substrate with a solution prepared by dissolving a liquid and/or gaseous chemical adsorbent in a solvent can be used to fix chemically adsorbed films to substrates. However, other known methods may also be used.

Solvents used for dissloving chemical adsorbents should not contain active hydrogen. For example, in the case where a chemical adsorbent comprises long-chain alkyl groups, a mixed solvent of hydrocarbons, halogenated carbons or the like can be used in the invention. Where a chemical adsorbent comprises carbonyl groups, on the other hand, a mixed solvent of halogenated hydrocarbons, aromatic compounds or the like can be used. However, the solvent of this invention is not limited to the above-noted solvents.

By removing any unreacted chemical adsorbent with a nonaqueous solvent after fixing the chemically adsorbed film to the substrate surface, a monomolecualr film and a multilayer monomolecular film can be easily formed. Halogenated hydrocarbons, ethers, lactones, esters, nitrites, amides or the like, are examples of suitable nonaqueous solvents. However, the nonaqueous solvents of the invention are not limited to these examples.

The invention will be explained in further detail with reference to the following examples. However, the invention is not restricted to the following examples.

EXAMPLES

Example 1

An adsorption solution A was prepared by dissolving about 1% by weight of (4-chloromethylphenyl) trichlorosilane into a mixed solvent of hexadecane, carbon tetrachloride and chloroform at a weight ratio of 80:12:8, respectively.

A glass substrate 1 (hydrophilic substrate) as shown in FIG. 1 was prepared. After being washed with an organic solvent, glass substrate 1 was dipped and held in adsorption solution A for three hours. Due to this treatment, a dehydrochlorination reaction between the Si—Cl of (4-chloromethylphenyl)trichlorosilane and OH of glass substrate 1 was generated, and bonds of the following Formula 5 were formed on glass substrate 1.

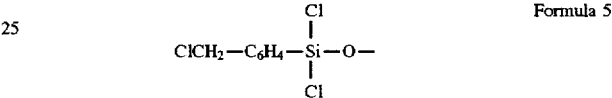

Formula 5

Figure 2:
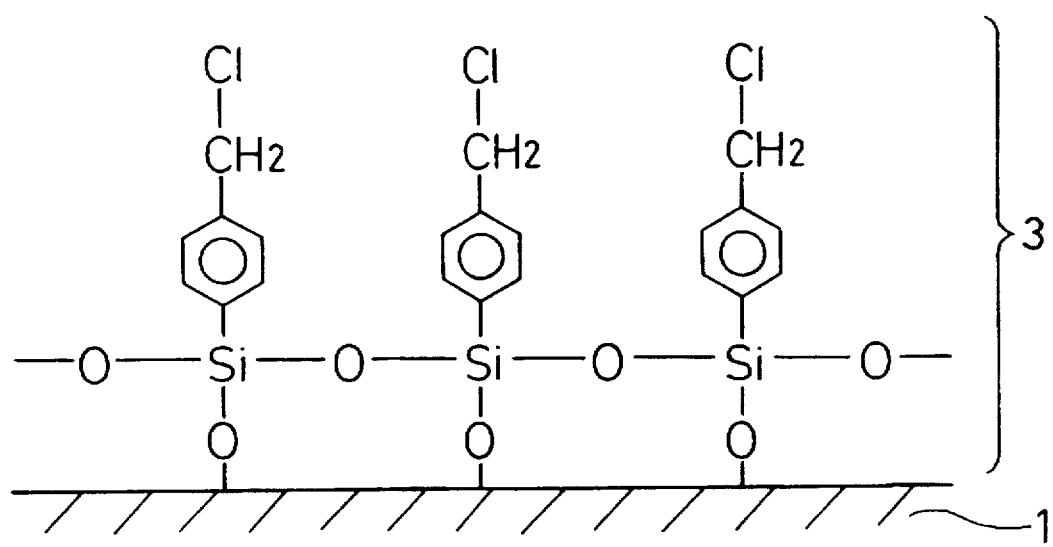
FIG. 2 shows an enlarged sectional view of a chemically adsorbed film of the example.

After washing glass substrate 1 with chloroform (nonaqueous solvent) for 10 minutes and with water for another 10 minutes, a chemically adsorbed film 3 of FIG. 2 was formed on the substrate surface. Chemically adsorbed film 3 was firmly bonded to glass substrate 1, and had water-repelling properties. The contact angle of water on the film was 65°.

The formation of the film was confirmed by obtaining particular signals for this structure at 1610, 1400 (attribute of a benzene skeleton), 1440 (attribute of CH$_2$Cl) and 1080 (attribute of Si—O)cm$^{-1}$ by Fourier transform infrared absorption spectral (FTIR) measurement.

Then, glass substrate 1 formed with chemically adsorbed film 3 was dipped and held in a dimethylsulfoxide solution containing about 5% by weight of glucose at 60° C. for two hours.

Figure 3:
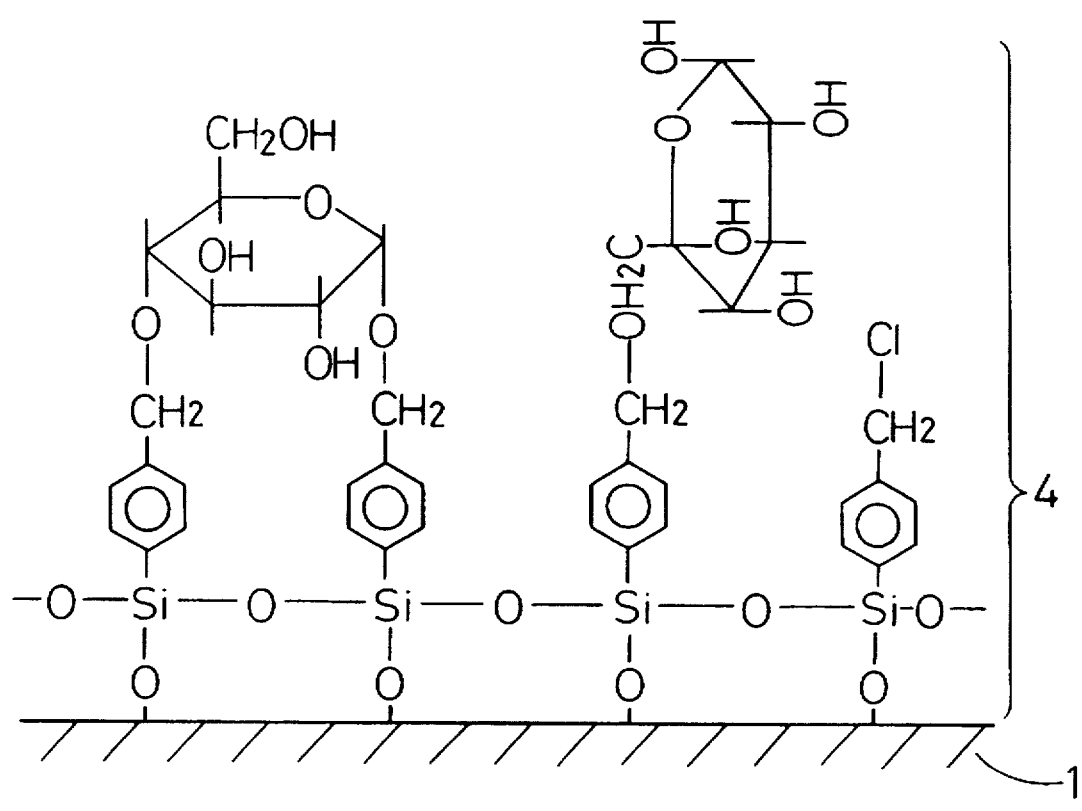
FIG. 3 shows an enlarged sectional view of a hydrophilic thin film of the example.

Thereafter, glass substrate 1 was washed with methanol for 10 minutes and then with water for another 10 minutes. As a result, a hydrophilic thin film 4 of FIG. 3 was formed on glass substrate 1. Hydrophilic thin film 4 was firmly bonded to glass substrate 1, and had hydrophilic properties. The contact angle of water on hydrophilic thin film 4 was 5°.

The creation of an additional particular signal at 3600 (attribute of O—H)cm$^{-1}$ was confirmed by FTIR measurement. In addition, the intensity of the signal at 1080 cm$^{-1}$ was increased from the signal obtained immediately after the formation of chemically adsorbed film 3, which indicates the fixation of glucose to the surface of chemically adsorbed film 3.

Example 2

An adsorption solution B was prepared by dissolving about 1% by weight of 4-(2-(trichlorosilyl)ethyl) benzenesulfonylchloride into a mixed solvent of hexadecane, carbon tetrachloride and chloroform at a weight ratio of 80:12:8, respectively.

Glass substrate 1 (hydrophilic substrate) of Example 1 was again used in this example. After being washed with an organic solvent, glass substrate 1 was dipped and held in adsorption solution B for two hours. Due to this treatment, a dehydrochlorination reaction was generated between Si—Cl of 4-(2-(trichlorosilyl)ethyl)benzenesulfonylchloride and OH of glass substrate 1, and bonds of the following Formula 6 were formed on glass substrate 1.

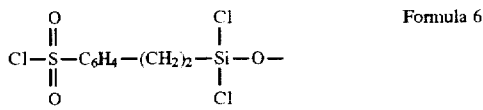

Formula 6

Figure 4:
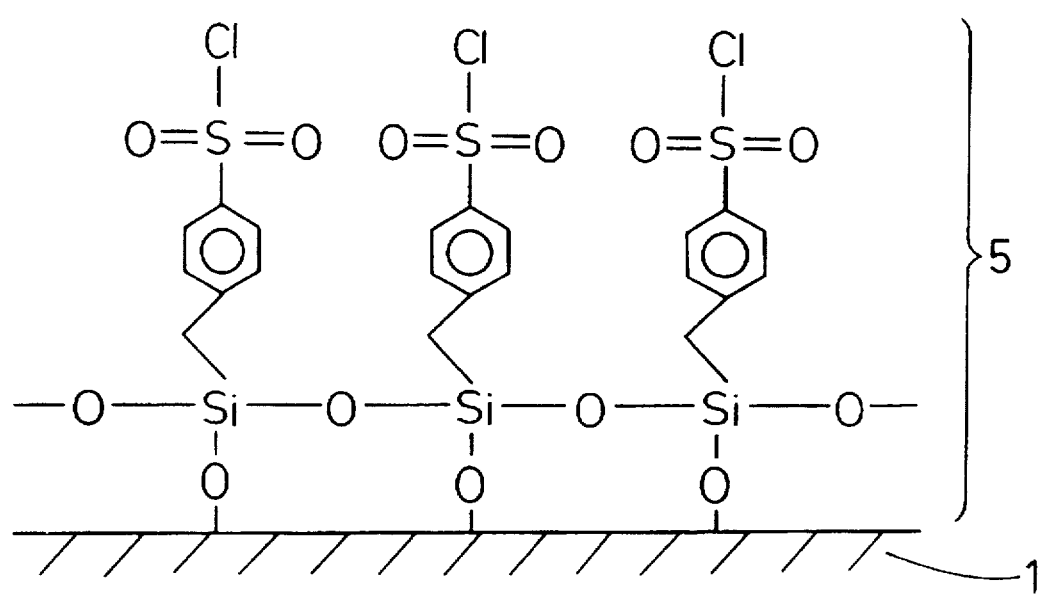
FIG. 4 shows an enlarged sectional view of a chemically adsorbed film of another example.

After washing glass substrate 1 with chloroform for 10 minutes and then with water for another 10 minutes, a chemically adsorbed film 5 of FIG. 4 was formed on the substrate surface. Chemically adsorbed film 5 was firmly bonded to glass substrate 1, and had water-repelling properties. The contact angle of water on the film was 62°.

The formation of the film was confirmed by obtaining particular signals for this structure at 1595, 1490 (attribute of a benzene skeleton), 1380, 1180 (attribute of O=S=O) and 1080 (attribute of Si—O)cm$^{-1}$ by FTIR measurement.

Then, glass substrate 1 formed with chemically adsorbed film 5 was dipped and held in a dimethylsulfoxide solution containing about 5% by weight of polyethyleneoxide (HO(CH$_2$CH$_2$O)$_n$H with an average molecular weight of 350) at 60° C. for three hours.

Figure 5:
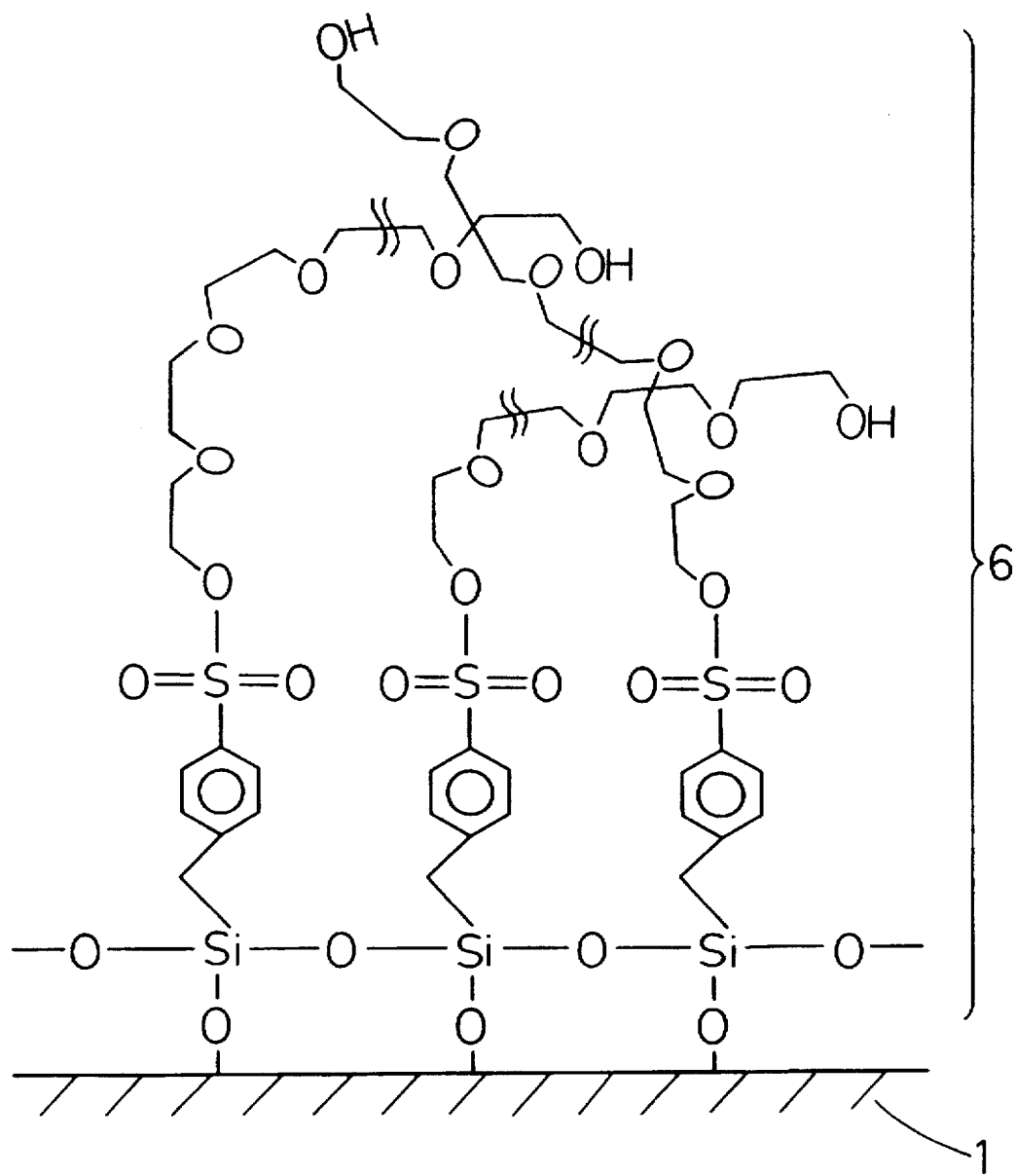
FIG. 5 shows an enlarged sectional view of a hydrophilic thin film of the example.
Figure 6:
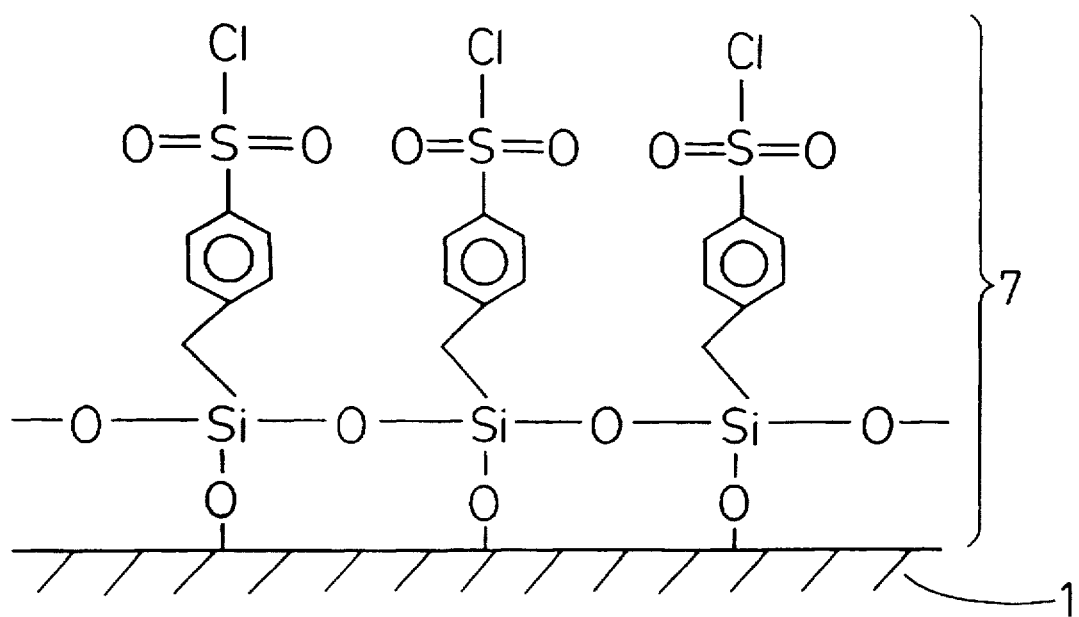
FIG. 6 shows an enlarged sectional view of a chemically adsorbed film of a further example.

After the above-noted procedure, glass substrate 1 was washed with methanol for 10 minutes and then with water for another 10 minutes. As a result, a hydrophilic thin film 6 of FIG. 5 was formed on glass substrate 1. The film was firmly bonded to the surface of glass substrate 1, and had hydrophilic properties. The contact angle of water on the film was about 3°.

According to FTIR measurement, the signals at 2920, 2860 (attribute of —CH$_2$—) and 1080 cm$^{-1}$ were intensified, thus indicating the fixation of polyethyleneoxide to chemically adsorbed film 5.

Example 3

Glass substrate 1 formed with hydrophilic thin film 6 of Example 2 was again dipped and held in adsorption solution B for 15 minutes, thus forming bonds of the following Formula 7 on the surface of hydrophilic thin film 6.

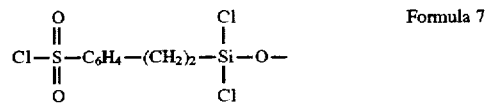

Formula 7

Glass substrate 1 was washed with chloroform for 10 minutes and then with water for another 10 minutes, thus forming a chemically adsorbed film 7 on the substrate surface. Chemically adsorbed film 7 was firmly fixed to the substrate surface, and had water-repelling properties. The contact angle of water on chemically adsorbed film 7 was 67°.

The formation of the film was confirmed by obtaining intensified signals at 1595, 1490, 1410 (attribute of a benzene skeleton), 1380, 1180 (attribute of O=S=O) and 1080 (attribute of Si—O)cm$^{-1}$ by FTIR measurement.

Figure 7:
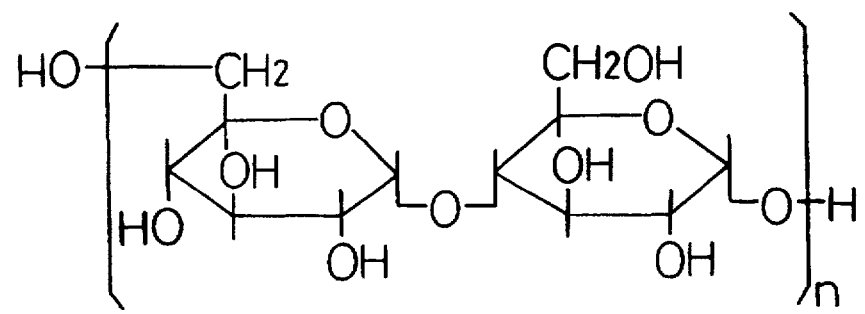
FIG. 7 shows an enlarged view of polysaccharide of the example.

Then, glass substrate 1 formed with chemically adsorbed film 7 was dipped and held in a dimethylsulfoxide solution containing about 5% by weight of polysaccharides of FIG. 7 at 60° C. for two hours.

Figure 8:
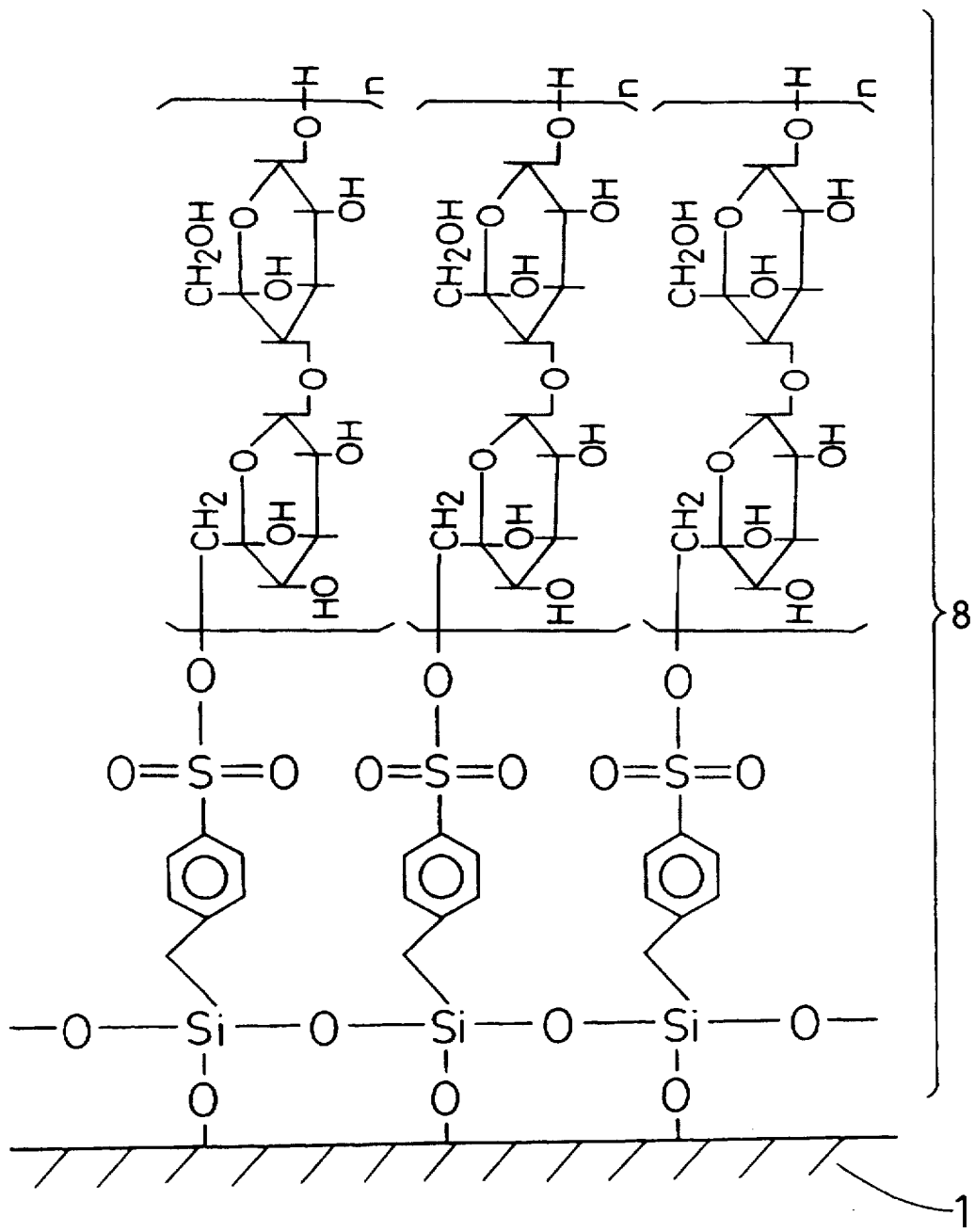
FIG. 8 shows an enlarged sectional view of a hydrophilic thin film of the example.

After that, glass substrate 1 was washed with methanol for 10 minutes and then with water for another 10 minutes. As a result, a hydrophilic thin film 8 of FIG. 8 was formed on the surface of glass substrate 1. The film was firmly bonded to the surface, and had hydrophilic properties.

The formation of hydrophilic thin film 8 was confirmed by obtaining intensified signals at 3650 (attribute of O—H), 2920, 2860 (attribute of —CH$_2$—) and 1080 cm$^{-1}$ by FTIR measurement, thereby confirming the fixation of polysaccharides to chemically adsorbed film 7.

Hydrophilic thin film 8 was highly hydrophilic. The contact angle of water on the film was about 0°, and therefore it was not possible to precisely measure the angle.

Example 4

Figure 9:
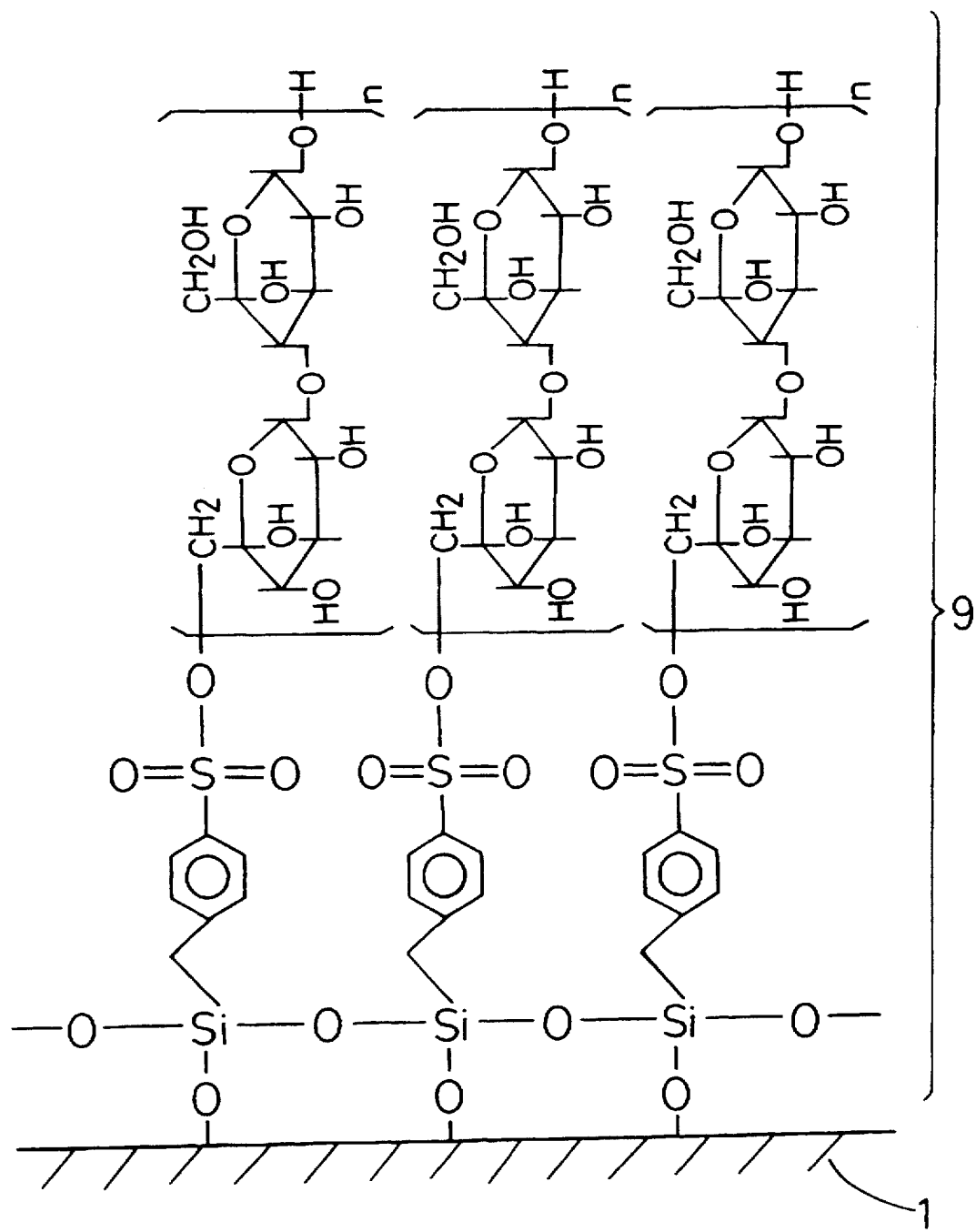
FIG. 9 shows an enlarged sectional view of a hydrophilic thin film of another example.

As shown in FIG. 9, a hydrophilic thin film 9 was formed on the surface of glass substrate 1 by the same method as Example 3. Hydrophilic thin film 9 had excellent hydrophilic properties.

An adsorption solution C was prepared by dissolving about 1% by weight of octadecyltrichlorosilane (C$_{18}$H$_{37}$SiCl$_3$) into a mixed solvent of hexadecane, carbon tetrachloride and chloroform at a weight ratio of 80:12:8, respectively.

Figure 10:
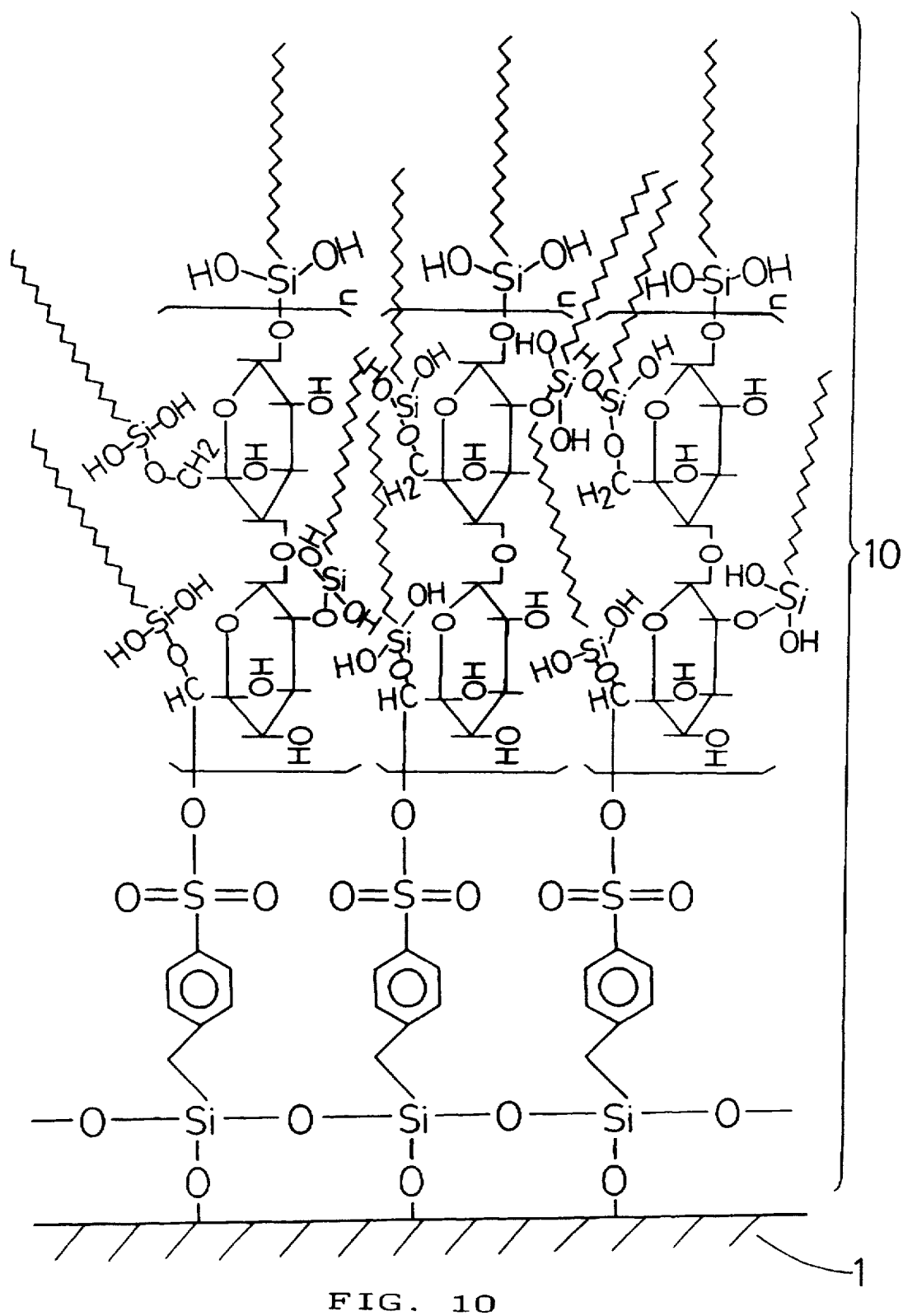
FIG. 10 shows an enlarged sectional view of a chemically adsorbed film of the example.

Glass substrate 1 formed with hydrophilic thin film 9 was dipped and held in adsorption solution C for two hours. Then, glass substrate 1 was washed with chloroform for 10 minutes and then with water for another 10 minutes. As a result, as shown in FIG. 10, a chemically adsorbed film 10 (multilayer monomolecular film) was formed on the surface of glass substrate 1.

The formation of chemically adsorbed film 10 was confirmed by obtaining intensified signals at 2960–2860 (attribute of CH$_3$ and —CH$_2$—) and 1080 cm$^{-1}$ by FTIR measurement. The contact angle of water on chemically adsorbed film 10 was 110°, which indicates that the film had excellent water-repelling properties.

Reference 1

Three 30 μl drops of water were separately dropped on an untreated glass substrate as used in Examples 1 and 2, and the substrate was left in the air at room temperature.

About 35 minutes were required for the drops to completely evaporate.

Similarly, three 30 μl drops of water were separately dropped on a glass substrate formed with hydrophilic thin film 4 of Example 1 and on a glass substrate formed with hydrophilic thin film 6 of Example 2, and the substrates were left in the air at room temperature. About 20 minutes were needed to completely evaporate the drops on hydrophilic thin film 4 and about 12 minutes for evaporating the drops on hydrophilic thin film 6.

According to these results, it was proved that a drop of water could easily evaporate on hydrophilic thin films of the invention. This is because a drop of water widely spreads on the surface of a hydrophilic thin film, and a wider surface area of the drop has more contact with the air. Therefore, the drop is easily evaporated. As a result, films of the invention were confirmed to be hydrophilic.

Reference 2

Figure 11:
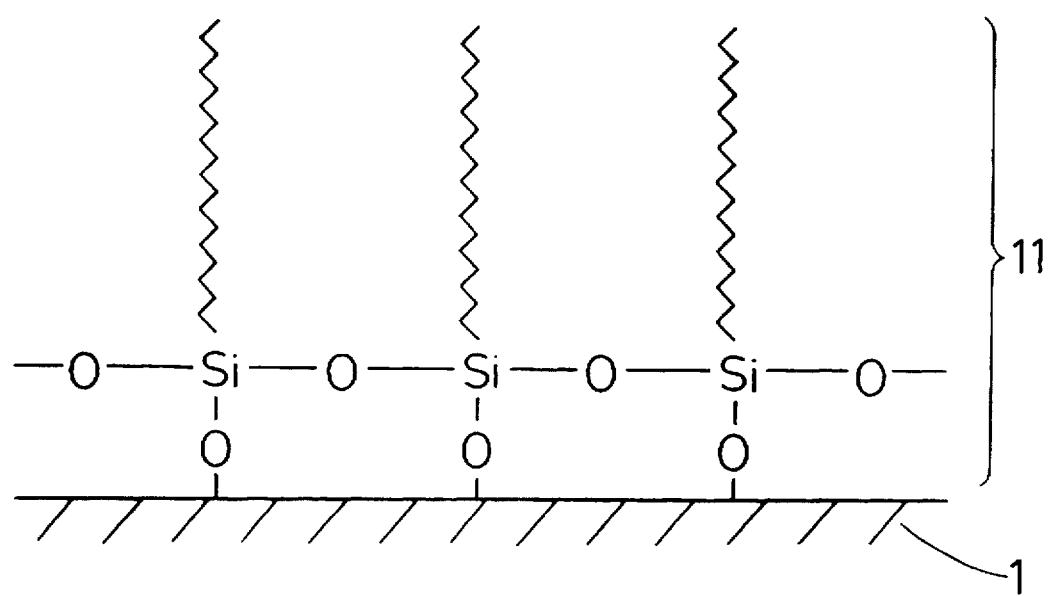
FIG. 11 shows an enlarged sectional view of a chemically adsorbed film of yet another example.

An untreated glass substrate as used in Example 4 was dipped and held in adsorption solution C for two hours. Following that, the substrate was washed with chloroform for 10 minutes and then with water for another 10 minutes. As a result, a chemically adsorbed film 11 of FIG. 11 was formed on the substrate surface.

The formation of the film was confirmed by obtaining particular signals for this structure at 2960-2860 (attribute of $CH_3$ and $-CH_2-$), 1470 (attribute of $-CH_2-$) and 1080 (attribute of Si—O)cm$^{-1}$ by FTIR measurement.

The contact angle of water on the surface of chemically adsorbed film 11 was 93°, which was 17° lower than the contact angle of water on the surface of chemically adsorbed film 10 of Example 4. This result indicates that chemically adsorbed film 10 is more water-repellent than chemically adsorbed film 11.

The excellent water-repellent properties of chemically adsorbed film 10 of Example 4 were provided by fixing polyethyleneoxide to the surface of the glass substrate and forming a hydrophilic thin film on the surface, thus increasing the significant number of hydroxyl groups on the surface of the substrate. As a result, the density of the molecules of chemical adsorbents which are applied to the surface of the hydrophilic thin film was improved, and the density of chemically adsorbed films formed on the hydrophilic thin film of polyethylene oxide was significantly higher than the density of the films formed directly on substrates. Due to the increase in water-repellent properties of chemically adsorbed films formed on the hydrophilic thin film, the hydrophilic properties of the hydrophilic thin film formed by fixing polyethyleneoxide became higher than the hydrophilic properties of the glass substrates.

Chemical adsorbents besides the ones used in Examples 1–4 can also be used for forming the films of this invention.

Example 5

Figure 12:
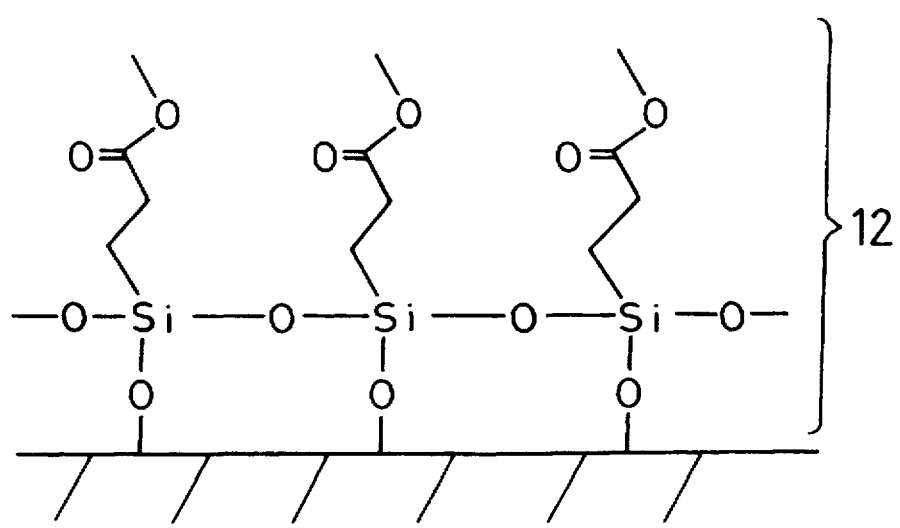
FIG. 12 shows an enlarged sectional view of a chemically adsorbed film of another example.

An adsorption solution D was prepared by dissolving about 1% by volume of carbomethoxyethyltrichlorosilane into a dry toluene. A glass substrate was dipped and held in adsorption solution D for one hour, and was washed with toluene for ten minutes, thus removing unreacted adsorption solution D. As a result, a chemically adsorbed film 12 of FIG. 12 was formed on the surface of the glass substrate.

The formation of chemically adsorbed film 12 was confirmed by obtaining particular signals for this structure at 2920, 2860 (attribute of $-CH_2-$), 1740 (attribute of C=O) and 1080 (attribute of Si—O—Si)cm$^{-1}$ by FTIR measurement.

Figure 13:
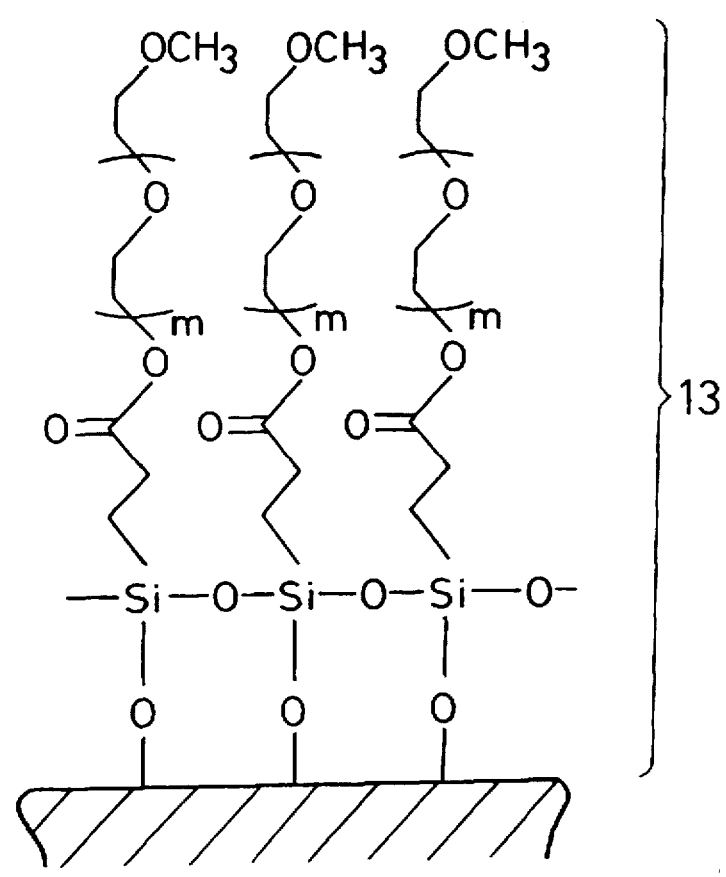
FIG. 13 shows an enlarged sectional view of a hydrophilic thin film of the example.

The glass substrate formed with chemically adsorbed film 12 on its surface was then dipped and held in a polyethyleneglycolmonomethylether with an average molecular weight of 350 (PEO 350) solution, containing a small amount of sulfuric acid, at 100° C. for five hours. The glass substrate was then washed with water for ten minutes, thus removing unreacted PEO 350. As a result, a hydrophilic thin film 13 of FIG. 13 was formed on the surface of the glass substrate.

According to FTIR measurement, the signals at 2920 and 2860 (attribute of $-CH_2-$)cm$^{-1}$ were intensified, and a new particular signal for this structure at 1140 (attribute of C—O—C)cm$^{-1}$ was obtained, thereby confirming the formation of hydrophilic thin film 13 on the surface of the glass substrate.

The contact angle of water on hydrophilic thin film 13 on the glass substrate was about 0°, and therefore it was not possible to precisely measure the angle.

While a glass substrate with no formation of hydrophilic thin film 13 was dimmed by steam instantaneously after exposure to boiling water at 100° C., the glass substrate formed with hydrophilic thin film 13 on its surface was not dimmed by the steam.

Example 6

An experiment similar to Example 5 was conducted in this example except that PEO350 was replaced with polyethyleneglycolmonomethylether with an average molecular weight of 750 (PRO750), thus forming a hydrophilic thin film on a substrate surface.

The formation of the hydrophilic thin film was confirmed by FTIR measurement.

The contact angle of water on the hydrophilic thin film, moreover, was about 0°, and therefore it was not possible to precisely measure the angle.

While a glass substrate with no formation of the hydrophilic thin film was dimmed by steam instantaneously after exposure to boiling water at 100° C., the glass substrate formed with the hydrophilic thin film on its surface was not dimmed by the steam.

Example 7

Figure 14:
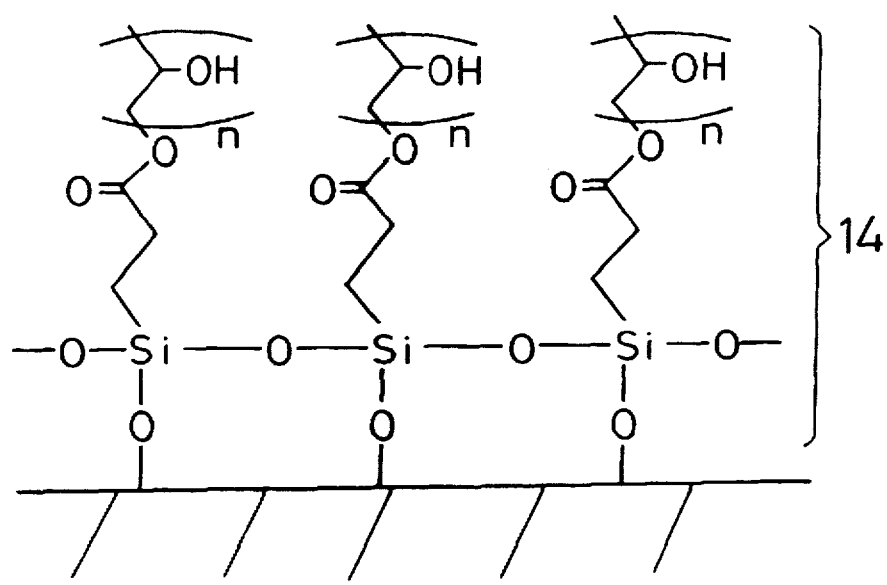
FIG. 14 shows an enlarged sectional view of a hydrophilic thin film of another example.

An experiment similar to Example 5 was conducted in this example except that PEO350 was replaced with polyvinylalcohol with an average molecular weight of 1000, thereby forming a hydrophilic thin film 14 of FIG. 14 on a substrate surface.

The formation of hydrophilic thin film was confirmed by FTIR measurement.

The contact angle of water on hydrophilic thin film 14 on the substrate surface was about 0°, and therefore it was not possible to precisely measure the angle.

Example 8

Figure 15:
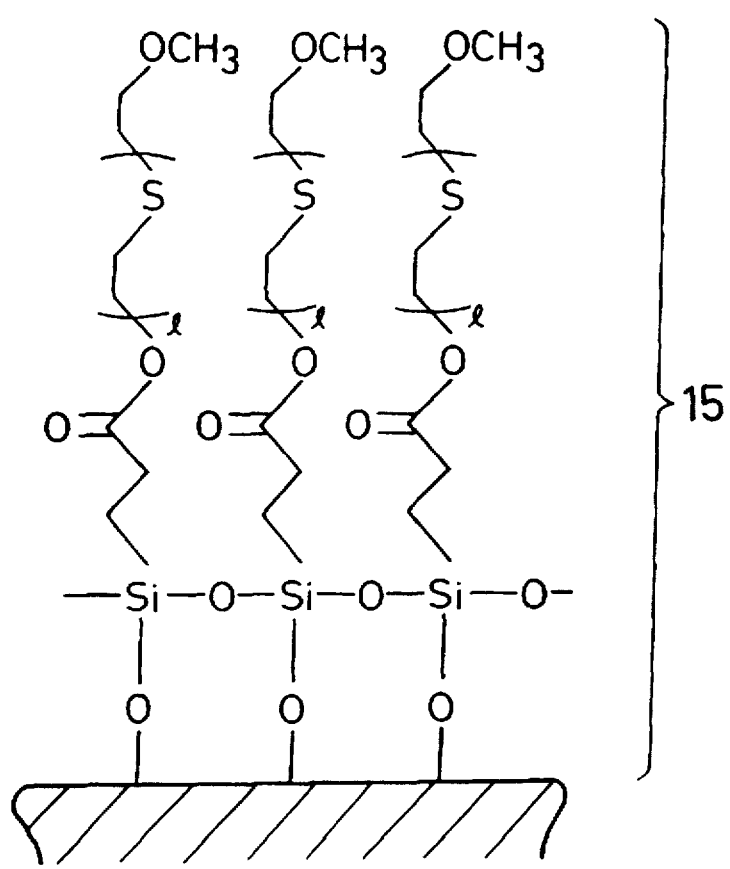
FIG. 15 shows an enlarged sectional view of a hydrophilic thin film of yet another example.

An experiment similar to Example 5 was conducted in this example except that PEO350 was replaced with polyethylenesulfidealcohol with an average molecular weight of 500, thus forming a hydrophilic thin film 15 of FIG. 15 on a substrate surface.

The formation of hydrophilic thin film 15 on the substrate surface was confirmed by FTIR measurement.

The contact angle of water on hydrophilic thin film 15 on the substrate surface was about 0°, and therefore it was not possible to precisely measure the angle.

Example 9

An experiment similar to Example 5 was conducted in this example except that carbomethoxyethyltrichlorosilane was replaced with (3-trichlorosilyl)propylsulfonylchloride, thus forming a chemically adsorbed film on a substrate surface.

Figure 16:
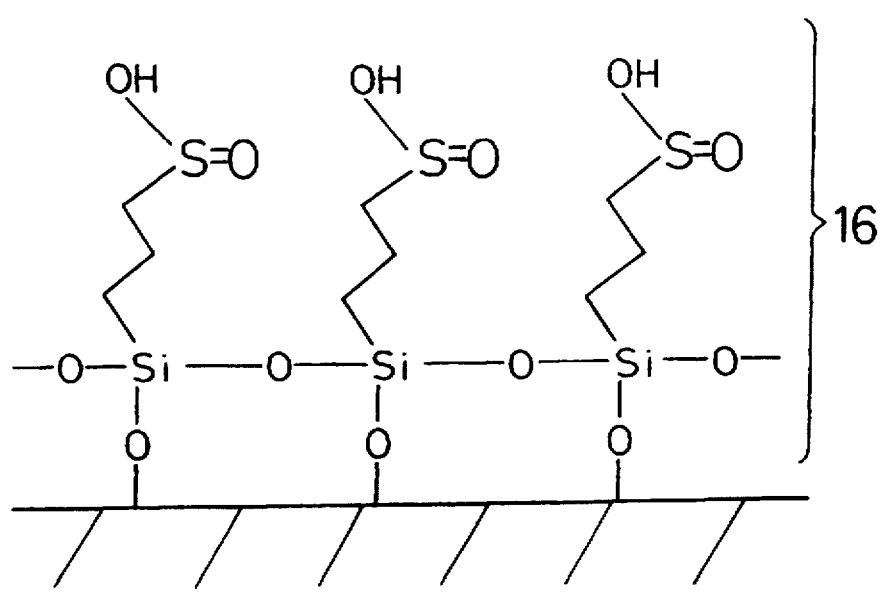
FIG. 16 shows an enlarged sectional view of a hydrophilic thin film of another example.

The chemically adsorbed film formed on the substrate surface was treated with $Na_2Co_3$ solution and then with NaOH solution, thereby forming a hydrophilic thin film 16 of FIG. 16 on the substrate surface.

The formation of hydrophilic thin film was confirmed by FTIR measurement.

Hydrophilic thin film 16 was highly hydrophilic. The contact angle of water on the film was about 5°.

While a glass substrate with no formation of hydrophilic thin film 16 was dimmed by steam instantaneously after exposure to boiling water at 100° C., the glass substrate formed with hydrophilic thin film 15 on its surface was not dimmed by the steam.

As explained above, the hydrophilic thin film of the invention has higher hydrophilic properties than glass. In this sense, the hydrophilic thin film is significantly useful for adding hydrophilic properties to substrate surfaces. For example, by forming the hydrophilic thin film of the invention on the surface of a glass, a glass with significant anti-fog properties can be manufactured. The hydrophilic thin film of the invention can be applied to substrate surfaces which require hydrophilic properties, in cases where conventional technologies can not be used for many reasons, including chemical reasons. For instance, as far as hydrophilic properties, safety and thickness are concerned, forming the hydrophilic thin film of the invention is the most suitable method of providing hydrophilic properties to the surfaces of biomaterials. In this sense, the hydrophilic thin film of the invention can be useful in many different areas.

Furthermore, since the hydrophilic thin film of the invention comprises at least one compound selected from the group consisting of saccharides, cyclodextrins, polyethers, polyalcohols, polyethylene oxides, Poly-N-vinyllactams, polymethacrylamides, polymethaacrylic acids, polymethaacrylic acid esters, and polyvinyl amines, the film can add superior hydrophilic properties to substrate surfaces without reducing the transparency and endurance of the surfaces or scratching them.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes which come within the meaning and range of equivalency of the claims are intended to be embraced therein.

We claim:

1. A composite-layer film comprising a chemically adsorbed film and an exposed surface layer, said chemically adsorbed film being a monomolecular film or a multi-layer monomolecular film that is chemically bonded to a substrate, said exposed surface layer comprising molecules having hydrophilic groups present on an outer surface of said exposed surface layer, said molecules being hydrophilic polymers selected from the group consisting of polysaccharides, polyethers, polyalcohols, polyethylene oxides, poly-N-vinyllactams, polymethacrylamides, polymethacrylic acids, polymethacrylic acid esters, and polyvinyl amines, wherein said exposed surface film is fixed to said chemically adsorbed film by way of said non-polar groups and has a water contact angle of 5° or less.

2. A hydrophilic film according to claim 1, wherein said chemically adsorbed film is chemically bonded to said substrate surface via at least one atom selected from the group consisting of C, Si, Ge, Sn, Ti, Zr and S.

3. A hydrophilic film according to claim 1, wherein said hydrophilic group is at least one functional group selected from the group consisting of an ether group, a sulfide group, an ester group, a phosphonyl group (—PO$_2$—), a phosphinyl group (—PO—), a sulfonyl group (—SO$_2$—), a sulfinyl group (—SO—), a hydroxyl group, a carboxyl group, a sulfonic acid group, a sulfinic acid group, a phosphoric acid group, a phosphorous acid group, a quaternary ammonium group, a quaternary phosphonium group, a thiol group, an amino group, a sulfate ester group, and a functional group in which the H atom, of at least one functional group selected from the group consisting of a hydroxyl group, a carboxyl group, a sulfonic acid group, a sulfinic acid group, a phosphoric acid group, a phosphorous acid group, and a thiol group, is replaced with an alkali metal or an alkali earth metal.

4. A hydrophilic film according to claim 1, wherein said chemically adsorbed film is produced by a process including washing with a non-aqueous solvent.

5. A method of manufacturing a composite-layer film comprising the steps of:

chemically bonding an adsorbed film to a substrate surface, said chemically adsorbed film being a monomolecular film or a multi-layer monomolecular film; and fixing at least one polymer molecule comprising hydrophilic groups selected from the group consisting of polysaccharides, polyethers, polyalcohols, polyethylene oxides, poly-N-vinyllactams, polymethacrylamides, polymethacrylic acids, polymethacrylic acid esters, and polyvinyl amines, to said chemically adsorbed film to produce an exposed surface film having a water contact angle of 5° or less.

6. A method according to claim 5, wherein a chemical adsorbent used for forming said chemically adsorbed film contains molecules comprising at least one functional group selected from the group consisting of a functional group of Formula 1, a functional group of Formula 2, a halogenated sulfonyl group of Formula 3, a halogenated sulfinyl group of Formula 4 and a cyano group (—CN):

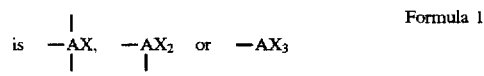

where A represents Si, Ge, Sn, Ti or Zr; and X, X$_2$ and X$_3$ independently represents a halogen, an alkoxyl group, a cyano group or an isocyanate group;

where A' represents N or O;

where X represents a halogen; and

where X represents a halogen.

7. A method according to claim 5, wherein said hydrophilic group is at least one functional group selected from the group consisiting of an ether group, a sulfide group, an ester group, a phosphonyl group (—PO$_2$—), a phosphinyl group (—PO—), a sulfonyl group (—SO$_2$—), a sulfinyl group (—SO—), a hydroxyl group, a carboxyl group, a sulfonic acid group, a sulfinic acid group, a phosphoric acid group, a phosphorous acid group, a quaternary ammonium group, a quaternary phosphonium group, a thiol group, an amino group, a sulfate ester group, and a functional group in which the H atom, of at least one functional group selected from the group consisting of a hydroxyl group, a carboxyl group, a sulfonic acid group, a sulfinic acid group, a phosphoric acid group, a phosphorous acid group, and a thiol group, is replaced with an alkali metal or an alkali earth metal.

8. A method according to claim 5, wherein the chemically adsorbed film is produced by a process including washing with a non-aqueous solvent.

* * * * *

UNITED STATES PATENT AND TRADEMARK OFFICE
CERTIFICATE OF CORRECTION

PATENT NO. : 5,780,148

DATED : July 14, 1998

INVENTOR(S) : Tadashi OHTAKE et al.

It is certified that error appears in the above-identified patent and that said Letters Patent is hereby corrected as shown below:

Claim 6, Formula 2, delete the "," (comma) after –A'.

Signed and Sealed this

Eighteenth Day of May, 1999

Attest:

Q. TODD DICKINSON

Attesting Officer     Acting Commissioner of Patents and Trademarks